US006963339B2

(12) United States Patent
Leah et al.

(10) Patent No.: US 6,963,339 B2
(45) Date of Patent: Nov. 8, 2005

(54) FILTERING TREE MAP DATA FOR TREE MAP VISUALIZATION

(75) Inventors: Robert Leah, Cary, NC (US); Kenneth Parzygnat, Raleigh, NC (US); Robert Uthe, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 10/666,704

(22) Filed: Sep. 19, 2003

(65) Prior Publication Data

US 2005/0062741 A1 Mar. 24, 2005

(51) Int. Cl.[7] .......................... G06T 11/20; G06F 7/00; G06F 17/00; G06F 3/00; G06F 9/00
(52) U.S. Cl. ................. 345/440; 715/854; 715/853; 715/784; 707/102
(58) Field of Search ................ 345/440–449; 707/102; 715/784, 853, 854

(56) References Cited

U.S. PATENT DOCUMENTS

| | | | | |
|---|---|---|---|---|
| 5,515,487 | A | 5/1996 | Beaudet et al. | 395/140 |
| 5,570,460 | A | 10/1996 | Ramanujam | 395/124 |
| 5,577,188 | A | 11/1996 | Zhu | 395/326 |
| 5,786,820 | A | 7/1998 | Robertson | 345/357 |
| 5,917,492 | A | 6/1999 | Bereiter et al. | 345/357 |
| 5,950,168 | A | 9/1999 | Simborg et al. | 705/3 |
| 6,055,515 | A | 4/2000 | Consentino et al. | 705/27 |
| 6,101,279 | A | * 8/2000 | Nguyen et al. | 382/240 |
| 6,104,400 | A | 8/2000 | Halachmi et al. | 345/356 |
| 6,151,024 | A | 11/2000 | Alimpich et al. | 345/357 |
| 6,151,595 | A | 11/2000 | Pirolli et al. | 707/1 |
| 6,211,880 | B1 | 4/2001 | Impink, Jr. | 345/418 |
| 6,216,134 | B1 | 4/2001 | Heckerman et al. | 707/104 |
| 6,278,464 | B1 | 8/2001 | Kohavi et al. | 345/440 |
| 6,281,896 | B1 | 8/2001 | Alimpich et al. | 345/340 |
| 6,297,824 | B1 | 10/2001 | Hearst et al. | 345/357 |
| 6,301,579 | B1 | 10/2001 | Becker | 707/102 |
| 6,307,573 | B1 | 10/2001 | Barros | 345/764 |
| 6,314,424 | B1 | 11/2001 | Kaczmarski et al. | 707/10 |
| 6,341,280 | B1 | 1/2002 | Glass et al. | 707/3 |
| 6,348,935 | B1 | 2/2002 | Malacinski et al. | 345/853 |
| 6,373,484 | B1 | 4/2002 | Orell et al. | 345/420 |
| 6,380,937 | B1 | 4/2002 | Dong et al. | 345/440 |
| 6,380,957 | B1 | 4/2002 | Banning | 345/828 |
| 6,448,985 | B1 | 9/2002 | McNally | 345/784 |
| 6,466,918 | B1 | 10/2002 | Spiegel et al. | 705/27 |
| 6,470,383 | B1 | * 10/2002 | Leshem et al. | 709/223 |
| 6,489,968 | B1 | 12/2002 | Ortega et al. | 345/713 |
| 2003/0200347 | A1 | 10/2003 | Weitzman | 709/310 |

FOREIGN PATENT DOCUMENTS

WO　　WO 01/08053 A2　　2/2001

OTHER PUBLICATIONS

Schneiderman, Ben. "Tree Visualization with Tree–Maps: 2–d Space Filling Approach." ACM Trans. Graphics, vol. 11, No. 1, Jan. 1992, pp. 92–99.*

Johnson, Brian; and Ben Shneiderman. "Tree–Maps: A Space–Filling Approach to the Visualization of Hiearchical Information Structures". Visualization, 1991. Visualization '91, Proceedings., IEEE Conference on, Oct. 22–25, 1991. pp.:284–291.*

(Continued)

Primary Examiner—Almis R. Jankus
Assistant Examiner—Eric Woods
(74) Attorney, Agent, or Firm—Myers Bigel Sibley & Sajove, P.A.

(57) ABSTRACT

Data from a first data set utilized in generating a first tree map visualization is displayed by filtering the first data set so as to provide a second data set having a reduced amount of data relative to the first data set. A second tree map visualization is generated based on the second data set.

24 Claims, 5 Drawing Sheets

OTHER PUBLICATIONS

Screen Capture of activequote.fidelity.com/rtrnews/market_map.phtml, copyright 1999–2005, FMR Corp.

U.S. Patent Application for *Methods, Systems and Computer Program Products for Intelligent Positioning of Items in a Tree Map Visualization*, filed Sep. 19, 2003, U.S. Appl. No. 10/664,556.

U.S. Patent Application for *Methods, Systems and Compute Program Products forUse of Color Saturation To Highlight Items In a Tree Map Visualization*; filed Sep. 19, 2003, U.S. Appl. No. 10/665,749.

Research Disclosure "*Tree Navigator—a concept for navigation in big trees*", Aug. 2001, pp. 1384–1385.

Dachselt et al.: *Collapsible Cylindrical Trees: A Fast Hierarchical Navigation Technique*, In the Proceedings of the IEEE Symposium on Information Visualization 2001, 8 pages.

Johnson et al.: *Tree–Maps: A Space–Filling Approach to the Visualization of Hierarchal Information Structures*, Power Point Presentation, Feb. 14, 2001, 18 pages.

Keramopolous et al.: *A Formal Definition of the Users View (UV) of the Graphical Object Query Language (GOQL)*, In the Proceedings of the Sixth International Conference on Information Visualization (IV '02), 6 pages.

* cited by examiner

FILTERING TREE MAP DATA FOR TREE MAP VISUALIZATION

FIELD OF THE INVENTION

The present invention relates generally to displaying data on a display device. More particularly, the present invention relates to controlling the display of data that is displayed on "tree map" visualizations.

BACKGROUND OF THE INVENTION

As computer technology advances, computing systems have undertaken the management and processing of larger data systems. With data systems ranging from massive standalone databases to vast distributed networks, oftentimes the limiting factor in analyzing the state of a given system rests not with computing resources, but with the human operator. Specifically, though the computing system may aggregate vast quantities of data in near real-time, in many cases, a human being must visualize the compilation of data to draw effective conclusions from the visualization. Yet, the ability of the end user to digest compiled information varies inversely with the amount of data presented to the end user. Where the amount of compiled data becomes excessive, it can be nearly impossible for a human being to adequately analyze the data.

In an effort to address the foregoing difficulties, tree-map visualization methods have been developed. Initially proposed by Brian Johnson and Ben Shneiderman in the paper, Johnson et al., Tree-Maps: A Space-Filling Approach to the Visualization of Hierarchical Information Structures, Dept. of Computer Science & Human-Interaction Laboratory (University of Maryland June 1991), tree-map visualization techniques map "hierarchical information to a rectangular 2-D display in a space-filling manner" in which the entirety of a designated display space is utilized. Additionally, "[i]nteractive control allows users to specify the presentation of both structural (depth bounds, etc.) and content (display properties such as color mappings) information." Tree-map visualization techniques can be compared in a contrasting manner to traditional static methods of displaying hierarchically structured information.

According to conventional static methods, a substantial portion of hierarchical information can be hidden from user view to accommodate the view of the hierarchy itself. Alternatively, the entire hierarchy can be visually represented, albeit vast amounts of display space can be obscured, hence wasted, simply to accommodate the structure without regard to the hierarchical data in the hierarchy itself. In the tree-map visualization technique, however, sections of the hierarchy containing more important information can be allocated more display space while portions of the hierarchy which are deemed less important to the specific task at hand can be allocated less space. More particularly, in operation, tree-maps partition the display space into a collection of rectangular bounding boxes representing the tree structure. The drawing of nodes within the bounding boxes can be entirely dependent on the content of the nodes, and can be interactively controlled. Since the display space size is user controlled, the drawing size of each node varies inversely with the size of the tree, for instance the number of nodes. Thus, trees having many nodes can be displayed and manipulated in a fixed display space, yet still be visible even when dealing with 1 million objects.

Figure 1:
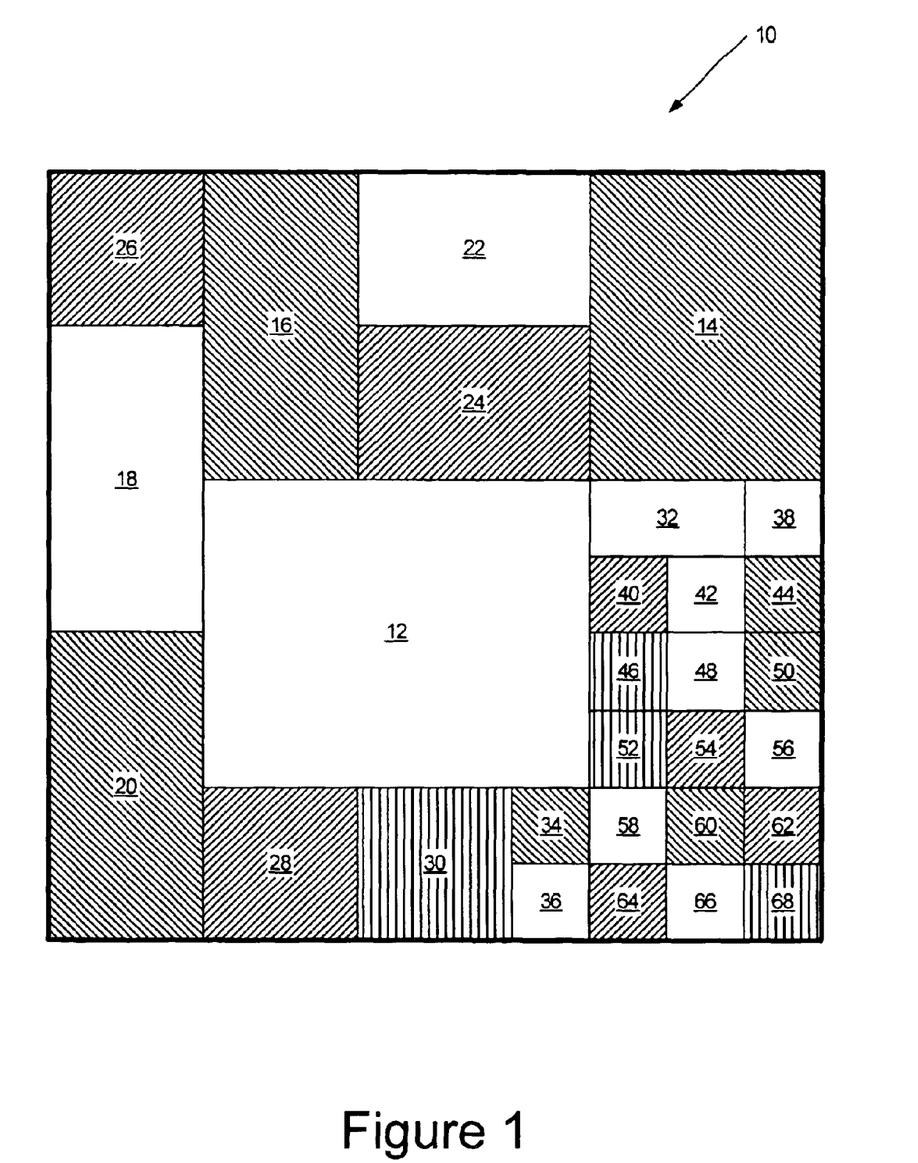
FIG. 1 is an illustration of the display of a set of data utilizing a conventional tree map.

FIG. 1 illustrates a conventional tree map display 10. As seen in FIG. 1, a 10 by 10 display grid is filled with bounding boxes 12 through 68 representing the display of a data set containing twenty-nine entries. Data values associated with the twenty-nine entries establish the size of the bounding boxes and the color of the box, as represented by the different cross-hatch patterns illustrated in FIG. 1. Thus, a first data value may establish the size of the bounding box, for example, market capitalization if the data set represents different stocks, and a second data value may establish the color of the bounding box, for example, the change in stock price. Thus, in the example illustrated in FIG. 1, the tree map display 10 is created from the data set of Table 1 below.

TABLE 1

Exemplary Data

| Bounding Box | First Data Value | Second Data Value |
|---|---|---|
| 12 | 20 | 1 (no cross-hatch) |
| 14 | 12 | 4 (diagonal left-right) |
| 16 | 8 | 4 (diagonal left-right) |
| 18 | 8 | 1 (no cross-hatch) |
| 20 | 8 | 4 (diagonal left-right) |
| 22 | 6 | 1 (no cross-hatch) |
| 24 | 6 | 3 (diagonal right-left) |
| 26 | 4 | 3 (diagonal right-left) |
| 28 | 4 | 3 (diagonal right-left) |
| 30 | 4 | 2 (vertical cross-hatch) |
| 32 | 2 | 1 (no cross-hatch) |
| 34 | 1 | 4 (diagonal left-right) |
| 36 | 1 | 1 (no cross-hatch) |
| 38 | 1 | 1 (no cross-hatch) |
| 40 | 1 | 3 (diagonal right-left) |
| 42 | 1 | 1 (no cross-hatch) |
| 44 | 1 | 4 (diagonal left-right) |
| 46 | 1 | 2 (vertical cross-hatch) |
| 48 | 1 | 1 (no cross-hatch) |
| 50 | 1 | 4 (diagonal left-right) |
| 52 | 1 | 2 (vertical cross-hatch) |
| 54 | 1 | 3 (diagonal right-left) |
| 56 | 1 | 1 (no cross-hatch) |
| 58 | 1 | 1 (no cross-hatch) |
| 60 | 1 | 4 (diagonal left-right) |
| 62 | 1 | 3 (diagonal right-left) |
| 64 | 1 | 3 (diagonal fight-left) |
| 66 | 1 | 1 (no cross-hatch) |
| 68 | 1 | 2 (vertical cross-hatch) |

A further example of the use of a tree map visualization is provided by Fidelity Investments' map of the stock market (which may be found at activequote.fidelity.com/rtmews/market_map.phtml). In the Fidelity market map, the market is divided into sectors and the sectors are populated with bounding boxes for individual stocks. The size of the bounding boxes is based on the market capitalization of the stock and the color of the boxes are based on the price activity of the stock.

SUMMARY OF THE INVENTION

Embodiments of the present invention provide for displaying data from a first data set utilized in generating a first tree map visualization. The first data set is filtered so as to provide a second data set having a reduced amount of data relative to the first data set. A second tree map visualization is generated based on the second data set.

In particular embodiments of the present invention, the second tree map visualization is generated based on the second data set so as to increase the size of bounding boxes associated with data common to both the first and the second data sets as compared to the first tree map visualization based on the first data set. The second tree map visualization may also be generated based on the second data set so as to decrease utilization of the processor in generating the tree map visualization based on the second data set as compared to processor utilization in generating the first tree map visualization based on the first data set.

In still further embodiments of the present invention, the first data set is filtered based on at least one of data values of data elements of the first data set utilized in generating the first tree map, data values of data elements of the first data set that are not utilized in generating the first tree map and/or metadata associated with the data elements of the first data set.

In additional embodiments of the present invention, filtering the first data set so as to provide a second data set having a reduced amount of data relative to the first data set is provided by filtering the first data set based on at least one threshold value of data utilized in generating the tree map visualization. Additionally, the threshold value may be set so as to provide a tree map visualization having a predefined minimum bounding box area. The predefined minimum bounding box area may be greater than a minimum area for a bounding box that a display device is capable of displaying. The threshold value may also be set by evaluating data in the first data set to establish the threshold value so as to provide a tree map visualization having the predefined minimum bounding box area In yet other embodiments of the present invention, filtering the first data set so as to provide a second data set having a reduced amount of data relative to the first data set is provided by filtering the first data set such that the second data set provides a tree map visualization with a predefined characteristic.

In additional embodiments of the present invention, a display is generated based on a third data set containing data filtered from the first data set to provide the third data set. The generated display may be a second tree map visualization.

As will further be appreciated by those of skill in the art, while described above primarily with reference to method aspects, the present invention may be embodied as methods, apparatus/systems and/or computer program products.

DETAILED DESCRIPTION OF THE INVENTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described in part below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention provide for selectively displaying data in tree map format on a display by filtering the data so as to display less than a complete set of data. Such filtering may provide a mechanism so as to reduce the volume of data displayed based on, for example, a predefined criteria. The predefined criteria may be a characteristic of the data itself or may be provided as metadata.

Figure 2:
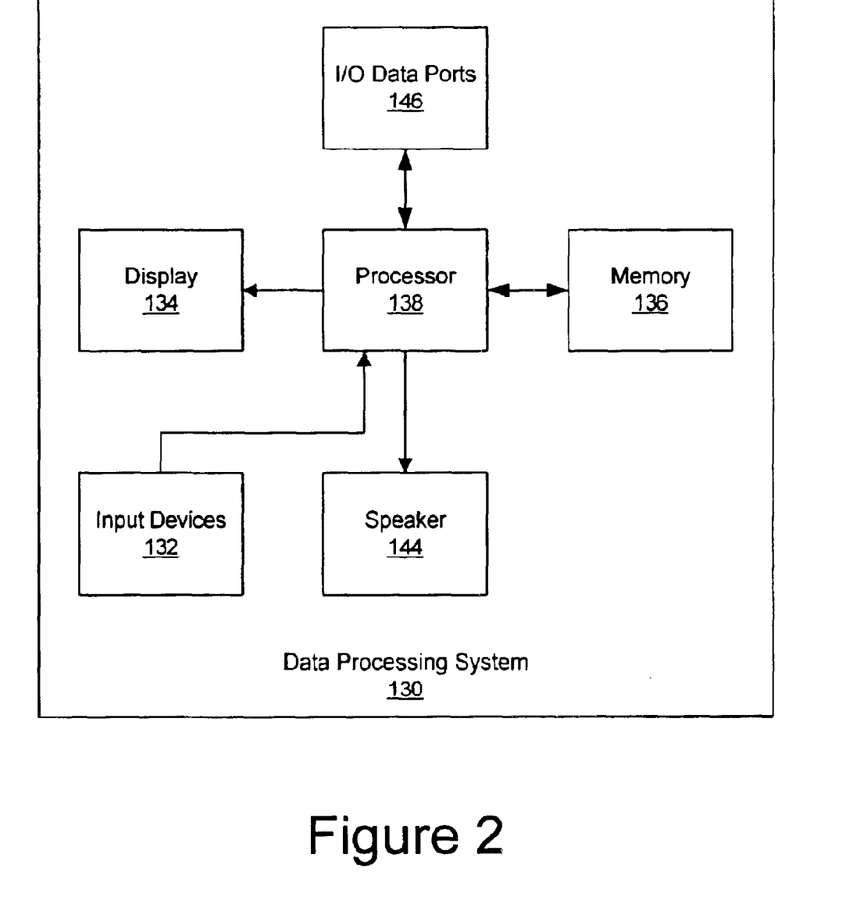
FIG. 2 is a block diagram of a data processing system suitable for use in embodiments of the present invention.

Various embodiments of the present invention will now be described with reference to the figures. FIG. 2 illustrates an exemplary embodiment of a data processing system 130 suitable for a server and network traffic associated with the replicated server in accordance with embodiments of the present invention. The data processing system 130 typically includes input device(s) 132 such as a keyboard, pointer, mouse and/or keypad, a display 134, and a memory 136 that communicate with a processor 138. The data processing system 130 may further include a speaker 144, and an I/O data port(s) 146 that also communicate with the processor 138. The I/O data ports 146 can be used to transfer information between the data processing system 130 and another computer system or a network. These components may be conventional components, such as those used in many conventional data processing systems, which may be configured to operate as described herein.

Figure 3:
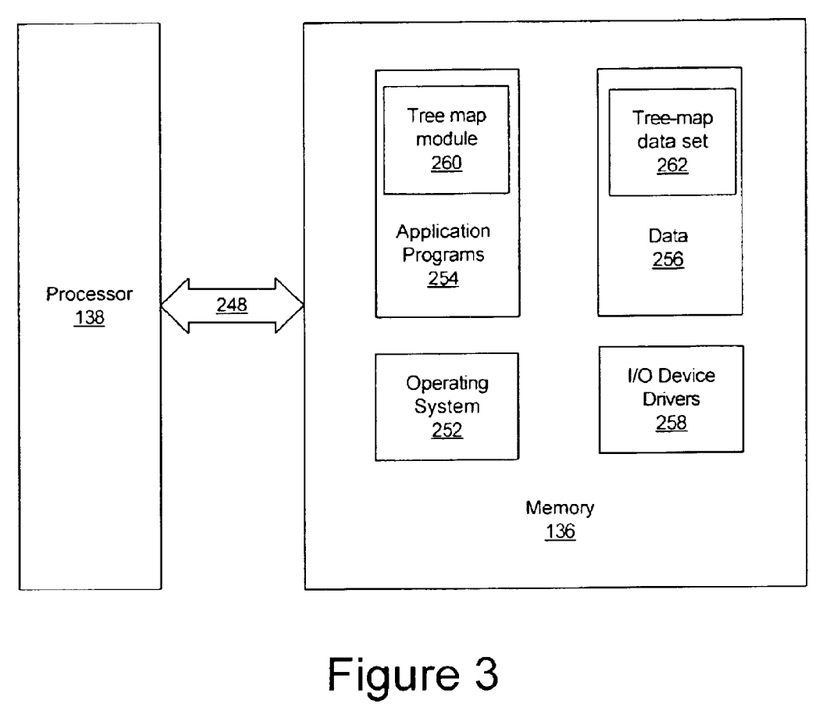
FIG. 3 is a more detailed block diagram of aspects of a data processing system that may be used in embodiments of the present invention.

FIG. 3 is a block diagram of data processing systems that illustrates systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices, and may contain the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 3, the memory 136 may include several categories of software and data used in the data processing system 130: the operating system 252; the application programs 254; the input/output (I/O) device drivers 258; and the data 256, which may include hierarchical data sets. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 130 and preferably include at least one application that supports operations according to embodiments of the present invention. Finally, the data 256 represents the static and dynamic data used by the application programs 254, the operating system 252, the I/O device drivers 258, and other software programs that may reside in the memory 136.

As is further seen in FIG. 3, the application programs 254 may include a tree map module 260. The tree map module 260 may carry out the operations described herein for displaying a tree map diagram of a data set, such as the tree map data 262. While the present invention is illustrated, for example, with reference to the tree map module 260 being an application program in FIG. 3, as will be appreciated by those of skill in the art, other configurations may also be utilized. For example, the tree map module 260 may also be incorporated into the operating system 252, the I/O device drivers 258 or other such logical division of the data processing system 130. Thus, the present invention should not be construed as limited to the configuration of FIG. 3 but encompasses any configuration capable of carrying out the operations described herein.

One difficulty with tree map visualizations is that as the amount of data increases, for a given size tree map, the size of the average bounding box decreases. However, the size of the minimum bounding box is fixed. Thus, if there is a large amount of data that has a small size bounding box, this data may take up large amount of the tree map display but may provide little information to a user.

For example, if a tree map display is a display of transaction times in a network and is to display one million transactions, if 500,000 of the transactions were at a minimum transaction time, then there would be 500,000 minimum size bounding boxes in the tree map. While the individual bounding boxes may be of minimum size, the aggregate space of the tree map may be significant. If the size of the bounding box reflects a relevance or significance of the underlying data, then a large amount of the display may be taken up be less relevant data. Furthermore, the overall size of the bounding boxes of the more relevant data may be decreased because the size of the average bounding box is decreased.

Also, in generating a tree map visualization, the size of the bounding boxes is dependent on all the data being displayed. Thus, the processor, typically, evaluates all of the data and then generates the tree map based on this evaluation. In the present example, the processor would still evaluate the 500,000 elements even though these may be of little importance to the user.

Embodiments of the present invention provide filtering of the data for a tree map visualization so as to reduce the amount of data displayed in the tree map. For example, the data set of Table 1 above may be filtered to remove elements with a first data value of less than or equal to two so as to provide a second data set. The second data set would only include elements corresponding to bounding boxes 12 through 30 of FIG. 1. A tree map visualization is then generated from the second, reduced data set. An example of the generated tree map is illustrated in FIG. 4.

Figure 4:
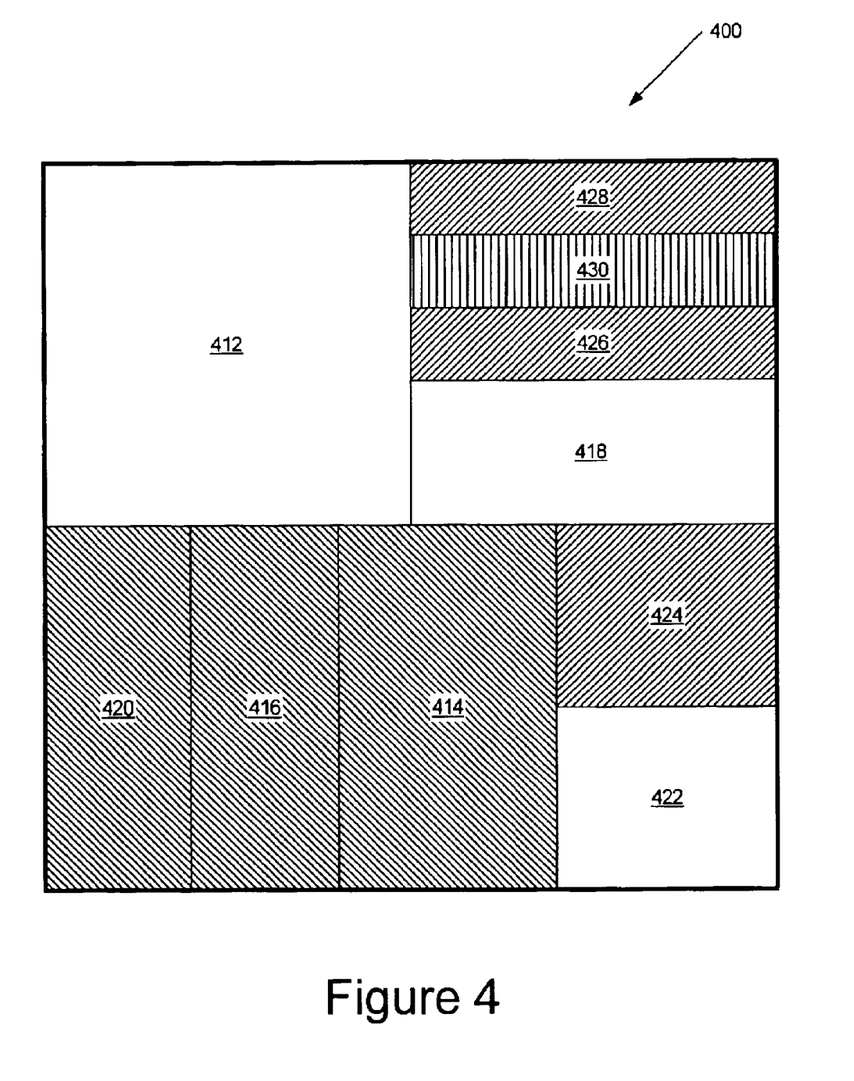
FIG. 4 is an illustration of the display of a set of data of FIG. 1 utilizing a tree map according to embodiments of the present invention.

As seen in FIG. 4, in comparison to FIG. 1 the bounding boxes for corresponding elements of the data set of Table 1 have increased. In FIG. 4, the bounding box 412 corresponds to the bounding box 12 of FIG. 1, the bounding box 414 corresponds to the bounding box 14 of FIG. 1, the bounding box 416 corresponds to the bounding box 16 of FIG. 1, the bounding box 418 corresponds to the bounding box 18 of FIG. 1, the bounding box 420 corresponds to the bounding box 20 of FIG. 1, the bounding box 422 corresponds to the bounding box 22 of FIG. 1, the bounding box 424 corresponds to the bounding box 24 of FIG. 1, the bounding box 426 corresponds to the bounding box 26 of FIG. 1, the bounding box 428 corresponds to the bounding box 28 of FIG. 1 and the bounding box 430 corresponds to the bounding box 30 of FIG. 1. By filtering the data set of Table 1 to provide a reduced data set for generation of the tree map of FIG. 4, the size of the bounding boxes have increased 20% over the bounding boxes of FIG. 1 for the corresponding data. Furthermore, the processor utilization in generation of the tree map of FIG. 4 has been reduced from evaluating 29 data elements to evaluating 10 data elements.

Figure 5:
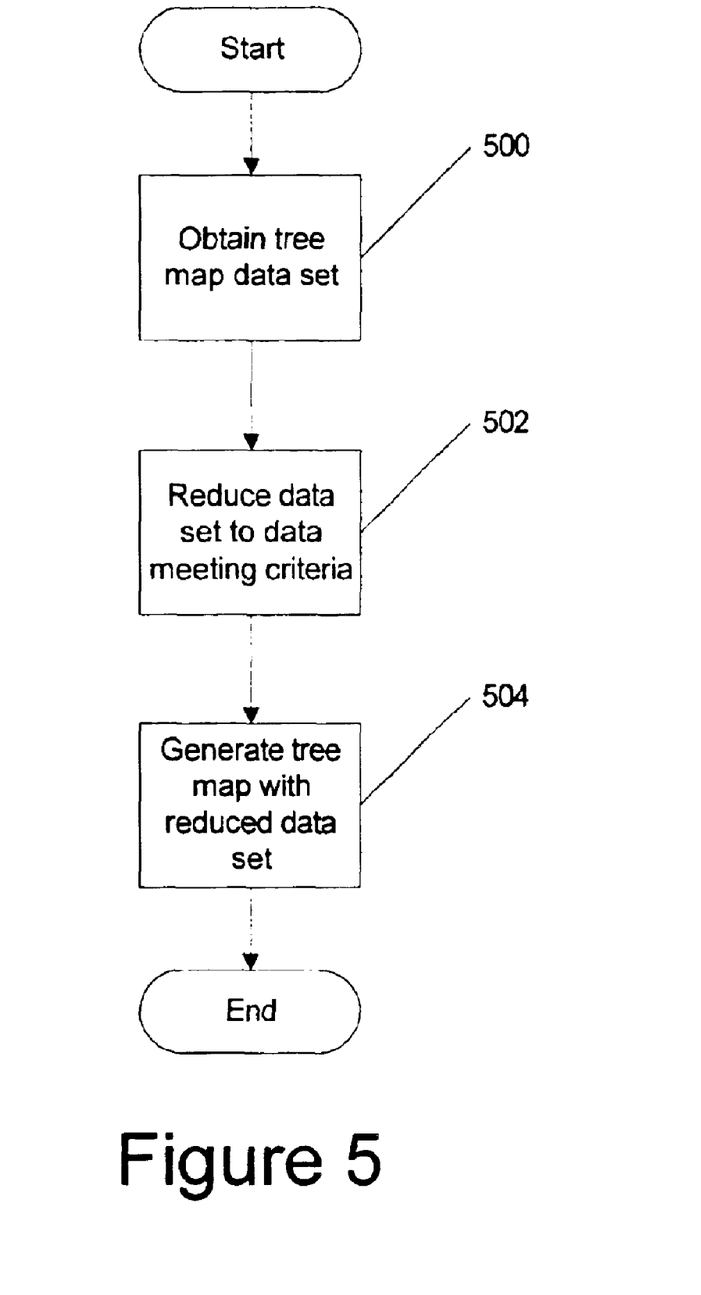
FIG. 5 is a flowchart illustrating operations according to embodiments of the present invention.

FIG. 5 is a flowchart illustration that depicts operations for filtering content for display on a tree map pursuant to embodiments of the present invention. As shown in FIG. 5, a first data set of tree map data is obtained (block 500). This first data set is filtered based on a criteria so as to provide a second data set having a reduced amount of data (block 502) over the first data set. The tree map is then generated from the reduced amount of data in the second data set (block 504).

The criteria for filtering the data from the first data set may be a predefined threshold value. The data may be filtered based on any suitable comparison to the threshold value, for example, greater than, less than, and/or equal to the threshold value. The data may also be filtered based on multiple threshold values to provide data falling within a range or ranges of data. The threshold values may be statically set, user specified and/or dynamically determined. The dynamic determination of thresholds may be provided based on an evaluation of the data values and/or a desired tree map characteristic. For example, the threshold value may be dynamically set to provide a data set with the 100 largest data values. Alternatively or additionally, the threshold value could be statically or dynamically set to provide a tree map with a predefined minimum size bounding box. Such a minimum bounding box size may be of greater area than the minimum area for a bounding box that a display device is capable of displaying. In such a case, a minimum value for the data value that determines the size of the bounding box could be preestablished or could be dynamically determined based on values in the data set.

Furthermore, the data may be filtered based on the values of data that is displayed in the tree map, data associated with the data that is displayed in the tree map and/or metadata associated with the tree map data set. In the first instance, the data may be filtered based on one or more of the data values that are used in generating the tree map. For instance, in the stock market example, the data may be filtered based on a minimum market capitalization and/or a minimum change in stock price. FIG. 4 is an example of such a filtering process.

The data set could also be filtered based on additional data associated with the data that generates the tree map. For instance, in the stock market example, the data may be filtered based on stock market activity where only those stocks with a trading activity above a threshold value are included in the tree map.

The data set could also be filtered based on metadata (i.e. data about the data) associated with the data set that generates the tree map. For example, the data set could be filtered based on a threshold that is set based on an average of values of the data in the data set. Similarly, the metadata may indicate a priority associated with elements of the data set and that priority used to filter the data. For instance, in the stock market example, stocks owned by a user and/or tracked by the user could be identified in metadata and the filtering based on whether a stock was owned, tracked and/or not prioritized.

In further embodiments of the present invention, the data elements filtered from the first data set to provide the second data set that is displayed in the tree map could provide a third data set and an additional tree map generated based on the third data set so as to display the items not displayed in the tree map generated based on the second data set. Thus, a user could toggle between a tree map based on the second data set and a tree map based on the third data set. Alternatively, the third data set could be displayed in an alternative display format, such as a table or conventional tree diagram.

In still further embodiments of the present invention, the user may toggle the filtering on and off so as to toggle between a tree map based on all of the data elements of the first data set and a tree map that is based on the results of the filtering of the first data set.

The flowcharts and block diagrams of FIGS. 2, 3 and 5 illustrate the architecture, functionality, and operation of possible implementations of systems, methods and computer program products for selectively controlling tree map graphical user interfaces according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

What is claimed is:

1. A computer-implemented method of displaying data from a first data set having a first amount of data utilized in generating a first tree map visualization, comprising:

filtering the first data set so as to provide a second data set having a second amount of data which is less than the first amount of data;

generating a second tree map visualization based on the second data set;

wherein filtering the first data set comprises filtering the first data set based on at least one threshold value of data utilized, in generating the second tree map visualization; and setting the at least one threshold value of data so as to provide a tree map visualization having a predefined minimum bounding box area that is greater than a minimum area for a bounding box that a display device is capable of displaying by evaluating data in the first data set to establish the at least one threshold value so as to provide a tree map visualization having the predefined minimum bounding box area.

2. The method of claim 1, wherein generating a second tree map visualization comprises generating a second tree map visualization based on the second data set so as to increase a size of bounding boxes associated with data common to both the first and the second data sets as compared to the first tree map visualization based on the first data set.

3. The method of claim 1, wherein generating a second tree map visualization comprises generating a second tree map visualization based on the second data set so as to decrease utilization of a processor in generating the second tree map visualization based on the second data set as compared to processor utilization in generating the first tree map visualization based on the first data set.

4. The method of claim 1, wherein the first data set is filtered based on at least one of data values of data elements of the first data set utilized in generating the tree map visualization, data values of data elements of the first data set that are not utilized in generating the second tree map visualization and/or metadata associated with the data elements of the first data set.

5. The method of claim 1, wherein filtering the first data set comprises filtering the first data set such that the second data set provides a tree map visualization with a predefined characteristic.

6. The method of claim 1, further comprising generating a display based on a third data set containing data filtered from the first data set to provide the third data set.

7. The method of claim 6, wherein the generated display comprises a second tree map visualization.

8. A computer-implemented system for displaying data from a first data set having a first amount of data utilized in generating a first tree map visualization, comprising:

means for filtering the first data set so as to provide a second data set having a second amount of data which is less than the first amount of data;

means for generating a second tree map visualization based on the second data set;

wherein the means for filtering the first data set comprises means for filtering the first data set based on at least one threshold value of data utilized in generating the second tree map visualization;

means for setting the at least one threshold value of data so as to provide a tree map visualization having a predefined minimum bounding box area that is greater than a minimum area for a bounding box that a display device is capable of displaying; and wherein the means for setting the at least one threshold value of data so as to provide a tree map visualization having a predefined minimum bounding box area comprises means for evaluating data in the first data set to establish the at least one threshold value so as to provide a tree map visualization having the predefined minimum bounding box area.

9. The system of claim 8, wherein the means for generating a second tree map visualization comprises means for generating a second tree map visualization based on the second data set so as to increase a size of bounding boxes associated with data common to both the first and the second data sets as compared to the first tree map visualization based on the first data set.

10. The system of claim 8, wherein the means for generating a second tree map visualization comprises means for generating a second tree map visualization based on the second data set so as to decrease utilization of a processor in generating the second tree map visualization based on the second data set as compared to processor utilization in generating the first tree map visualization based on the first data set.

11. The system of claim 8, wherein the first data set is filtered based on at least one of data values of data elements of the first data set utilized in generating the second tree map visualization, data values of data elements of the first data set that are not utilized in generating the second tree map visualization and/or metadata associated with the data elements of the first data set.

12. The system of claim 8, wherein the means for filtering the first data set comprises means for filtering the first data set such that the second data set provides a tree map visualization with a predefined characteristic.

13. The system of claim 8, further comprising means for generating a display based on a third data set containing data filtered from the first data set to provide the third data set.

14. The system of claim 13, wherein the generated display comprises a second tree map visualization.

15. A computer program product for displaying data from a first data set having a first amount of data utilized in generating a first tree map visualization, comprising:

a computer readable media having computer readable program code embodied therein, the computer readable program code comprising:

computer readable program code configured to filter the first data set so as to provide a second data set having a second amount of data which is less than the first amount of data;

computer readable program code configured to generate a second tree map visualization based on the second data sets;

wherein the computer readable program code configured to filter the first data set comprises computer readable program code configured to filter the first data set based on at least one threshold value of data utilized in generating the second tree map visualization; and computer readable program code configured to set the at least one threshold value of data so as to provide a tree map visualization having a predefined minimum bounding box area that is greater than a minimum area for a bounding box that a display device is capable of displaying by evaluating data in the first data set to establish the at least one threshold value so as to provide a tree map visualization having the predefined minimum bounding box area.

16. The computer program product of claim 15, wherein the computer readable program code configured to generate a second tree map visualization comprises computer readable program code configured to generate a second tree map visualization based on the second data set so as to increase a size of bounding boxes associated with data common to both the first and the second data sets as compared to the first tree map visualization based on the first data set.

17. The computer program product of claim 15, wherein the computer readable program code configured to generate a second tree map visualization comprises computer readable program code configured to generate a second tree map visualization based on the second data set so as to decrease utilization of a processor in generating the tree map visualization based on the second data set as compared to processor utilization in generating the first tree map visualization based on the first data set.

18. The program product of claim 15, wherein the first data set is filtered based on at least one of data values of data elements of the first data set utilized in generating the second tree map visualization, data values of data elements of the first data set that are not utilized in generating the second tree map visualization and/or metadata associated with the data elements of the first data set.

19. The computer program product of claim 15, wherein the computer readable program code configured to filter the first data set comprises computer readable program code configured to filter the first data set such that the second data set provides a tree map visualization with a predefined characteristic.

20. The computer program product of claim 15, further comprising computer readable program code configured to generate a display based on a third data set containing data filtered from the first data set to provide the third data set.

21. The computer program product of claim 20, wherein the generated display comprises a second tree map visualization.

22. A method of displaying data from a first data set having a first amount of data utilized in generating a first tree map visualization, comprising the following operations being carried out by one or more data processing systems:

filtering the first data set used in generating the first tree map visualization so as to provide a second data set having a second amount of data which is less than the first amount of data;

generating a second tree map visualization based on the second data set; and generating a display based on a third data set containing data filtered from the first data set to provide the third data set; and setting the at least one threshold value of data so as to provide a tree map visualization having a predefined minimum bounding box area that is greater than a minimum area for abounding box that is greater than a minimum area for a bounding box that a display device is capable of displaying by evaluating data in the first data set to establish the at least one threshold value so as to provide a tree map visualization having the predefined minimum bounding box area.

23. A system comprising means configured to carry out the operations of claim 22.

24. A computer program product comprising computer readable program code configured to carry out the operations of claim 22.

* * * * *